(12) United States Patent
Winnard

(10) Patent No.: US 10,716,413 B2
(45) Date of Patent: Jul. 21, 2020

(54) MAGNETIC TOOL HOLDER

(71) Applicant: Stanley D Winnard, Dallas, TX (US)

(72) Inventor: Stanley D Winnard, Dallas, TX (US)

(*) Notice: Subject to any disclaimer, the term of this patent is extended or adjusted under 35 U.S.C. 154(b) by 0 days.

(21) Appl. No.: 16/530,952

(22) Filed: Aug. 2, 2019

(65) Prior Publication Data

US 2019/0350384 A1 Nov. 21, 2019

Related U.S. Application Data

(63) Continuation of application No. 14/983,995, filed on Dec. 30, 2015, now Pat. No. 10,413,092.

(51) Int. Cl.
*A47F 5/08* (2006.01)
*A47F 7/00* (2006.01)
*B25H 3/04* (2006.01)
*F16B 1/00* (2006.01)

(52) U.S. Cl.
CPC .......... *A47F 5/0823* (2013.01); *A47F 7/0021* (2013.01); *B25H 3/04* (2013.01); *F16B 1/00* (2013.01); *F16B 2001/0035* (2013.01)

(58) Field of Classification Search
CPC ........ A47F 5/0823; A47F 7/0021; F16B 1/00; F16B 2001/0035; B25H 3/04
USPC ......... 211/59.1, 70.6; 248/206.5, 309.4, 314, 248/683; 206/349, 350, 372, 373, 378, 206/495
See application file for complete search history.

(56) References Cited

U.S. PATENT DOCUMENTS

| | | | | |
|---|---|---|---|---|
| 2,474,036 A * | 6/1949 | Curley | .................. | H01F 7/0247 335/285 |
| 3,229,820 A * | 1/1966 | Hentzi | ..................... | B25H 3/04 211/70.6 |
| 3,419,832 A * | 12/1968 | Baermann | ................ | B25H 3/04 335/285 |
| 3,827,021 A * | 7/1974 | Phelon | .................... | A47J 47/16 335/285 |
| 4,586,616 A * | 5/1986 | Cooper | .................... | A47J 47/16 211/88.04 |
| 4,591,817 A * | 5/1986 | Miller | .................... | H01F 7/0215 335/285 |
| 5,301,822 A * | 4/1994 | Coleman | .................. | B25H 3/04 211/70.6 |
| 6,216,888 B1 * | 4/2001 | Chien | .................. | B23Q 3/1546 211/70.6 |
| 6,811,127 B1 * | 11/2004 | Shiao | ........................ | B25H 3/04 211/70.6 |
| 7,971,736 B1 * | 7/2011 | Stewart | .................... | B25H 3/04 211/70.7 |
| 8,336,709 B1 * | 12/2012 | Geibel | ..................... | B25H 3/06 206/350 |
| 9,560,923 B1 * | 2/2017 | Winnard | ............... | A47F 5/0823 |

(Continued)

*Primary Examiner* — Joshua E Rodden
(74) *Attorney, Agent, or Firm* — Peter V. Schroeder; Booth Albanesi Schroeder PLLC

(57) ABSTRACT

A magnetic tool holder has a frame for maintaining magnetic panels in position. Each of the magnetic panels has an upper surface for magnetic attachment and longitudinal sides defining longitudinal stepped edges. The longitudinal members of the frame have a longitudinal lip which cooperates with a stepped edge of the magnetic panels. A base member is attached to the frame and supports the magnetic panels keeping the top surfaces of the panels exposed for attachment.

13 Claims, 12 Drawing Sheets

(56) References Cited

U.S. PATENT DOCUMENTS

2009/0218463 A1\* 9/2009 Winnard .................. B25H 3/04
248/309.4

\* cited by examiner

MAGNETIC TOOL HOLDER

PRIORITY CLAIM

This is a continuation application claiming priority to U.S. patent application Ser. No. 14/983,995, filed Dec. 30, 2015.

BACKGROUND

Field of the Invention

The present invention relates to tool holders and more particularly to a tool holder that is used in conjunction with a pegboard.

A perforated hardboard, which is popularly known as pegboard, is a tempered hardboard predrilled with evenly spaced peg holes. Pegboards are also known to be made of wood, steel, plastic, etc. In order for a pegboard to support various peggable items, especially the items such as, kitchen tools or workshop tools, pegs or hooks are secured within the peg holes whereafter, the aforementioned tools are hung thereupon. Securing pegs or hooks to a pegboard is a time-consuming process as, most of the times, the pegs or hooks are required to be secured with fasteners, such as, screws, or the like, so that, the pegs or hooks they do not come off of it. This is caused by the hooks getting stuck with the tools whereby, as the tools are disengaged from the pegboard, the hooks come off with them. Even if the inconvenience of the securing pegs and hooks is ignored for a moment, one needs to pay attention while securing certain elongate tools to the pegboard (about the pegs and hooks) as these tools require to be supported by not one, but two or more pegs or hooks.

Therefore, in the light of what is discussed, there is a need in the art for a solution in the form of a tool-supporting device, or the like, that is easily secured to a pegboard. Secondly, there is a need in the art to ease the process of securing a tool to the pegboard by providing a convenient alternative to conventional pegs or hooks.

Summary

The present invention comprises a magnetic tool holder which is adapted to be secured to a pegboard, or any suitable vertical structure. The tool holder comprises a tool holder base, a rectangular magnetic panel, and a magnet holder for securing the magnetic panel to the tool holder base. The tool holder base comprises a rectangular structure defined by top and bottom surfaces and four sidewalls extending between the top and bottom surfaces. Notably, the top edges of the sidewalls extend beyond the top surface so as to form an open receptacle between the extended sidewalls and the top surface. The inner surface of each longitudinal sidewall is lined with an elongate base groove.

The magnet holder comprises a rectangular magnet base and a pair of opposingly-disposed elongate L-shaped members extending from the magnet base wherein, a groove is formed between an L-shaped member and the magnet base. Further, the magnet holder comprises a pair of opposingly-disposed elongate ridges disposed on the horizontal outer surfaces of the L-shaped member wherein, each ridge is configured to correspond to the base groove lined on the tool holder base.

In order to assemble the magnet holder and the magnetic panel, the magnetic panel is simply slid into the magnet holder through the grooves formed between the L-shaped members and the magnet panel. Notably, the magnetic panel is dimensionally configured such that, the top surface of the magnetic panel becomes flush with the top surfaces of the L-shaped members once the magnetic panel is inserted into the magnet holder. Once the magnetic panel and the magnet holder are assembled, the magnet holder is placed between the sidewalls and pushed downwards causing the ridge to slide into the base groove resulting in the magnet holder being snap-fitted into the tool holder base.

Other objects and advantages of the embodiments herein will become readily apparent from the following detailed description taken in conjunction with the accompanying drawings.

FIGURES—REFERENCE NUMERALS

10—Magnetic Tool Holder
12—Tool
14—Pegboard
16—Tool Holder Base
18—Magnetic Panel
19—Magnet Holder
20—Ribbed Top Surface
22—Base Sidewall
22A—Longitudinal Base Sidewall
22B—Lateral Base Sidewall
24—Base Groove
26—Magnet Base
28—L-shaped Member
28H—Horizontal Member
28V—Vertical Member
30—Magnet Groove
32—Ridge
34—Longitudinal Stepped Edge
36—Ribbed Leg
38—Oblique Notch
40—Top Panel
42—Rectangular Opening
44—Magnet Holder Sidewall
46—Oblique Projection

DETAILED DESCRIPTION

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

Figure 1:
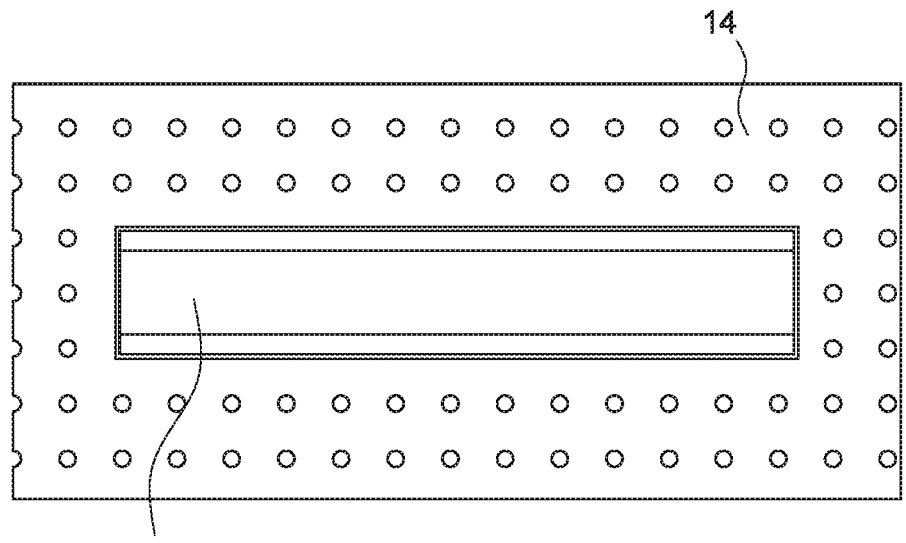
FIG. 1, according to an embodiment of the present invention, is an illustration of the tool holder engaged to a pegboard.
Figure 2:
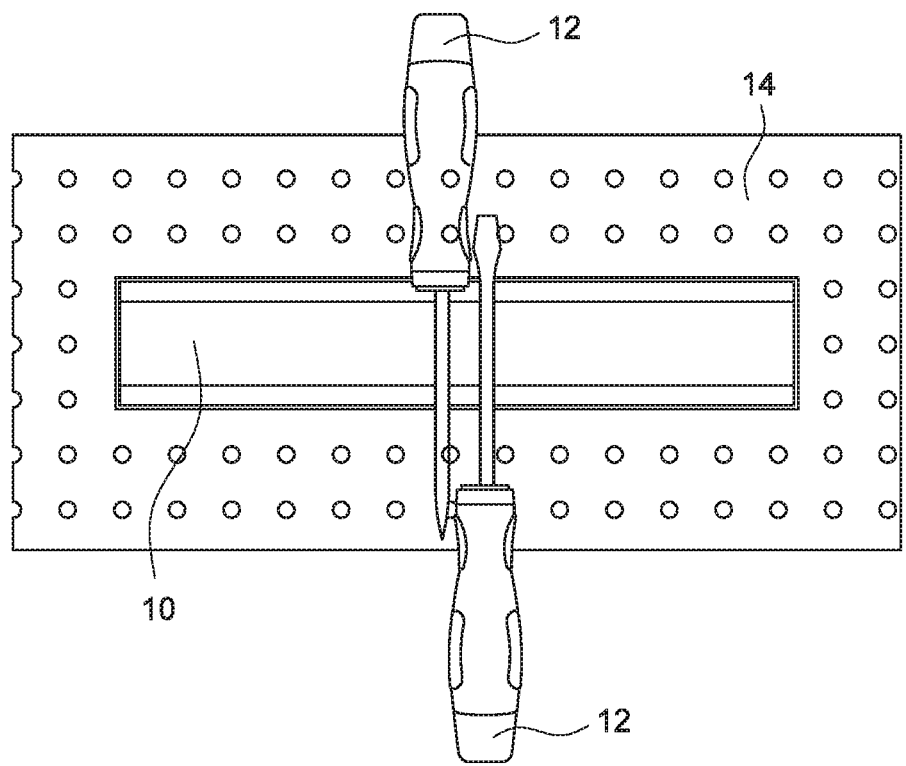
FIG. 2, according to an embodiment of the present invention, is an illustration of tools attached to the tool holder, which in turn is engaged to a pegboard.
Figure 3:
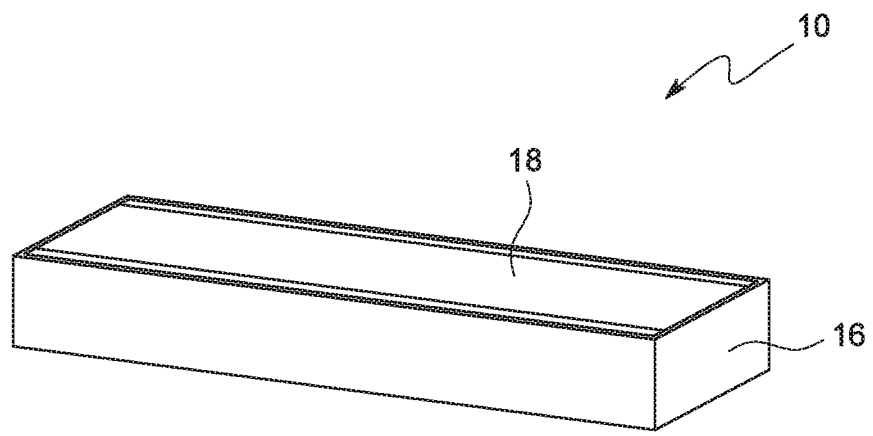
FIG. 3, according to an embodiment of the present invention, is an illustration of a perspective view of the tool holder.
Figure 4:
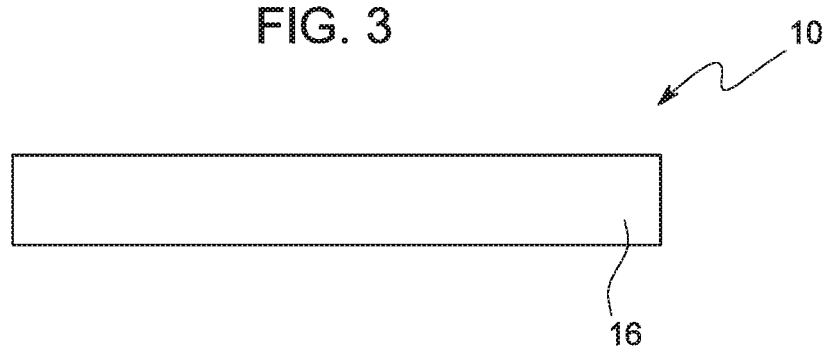
FIG. 4, according to an embodiment of the present invention, is an illustration of the top view of the tool holder.
Figure 5:
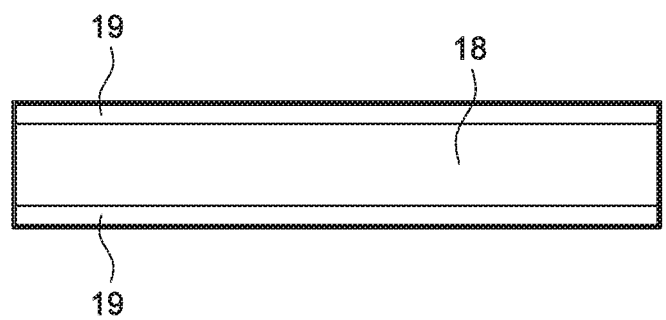
FIG. 5, according to an embodiment of the present invention, is an illustration of the front views of the tool holder.
Figure 6:
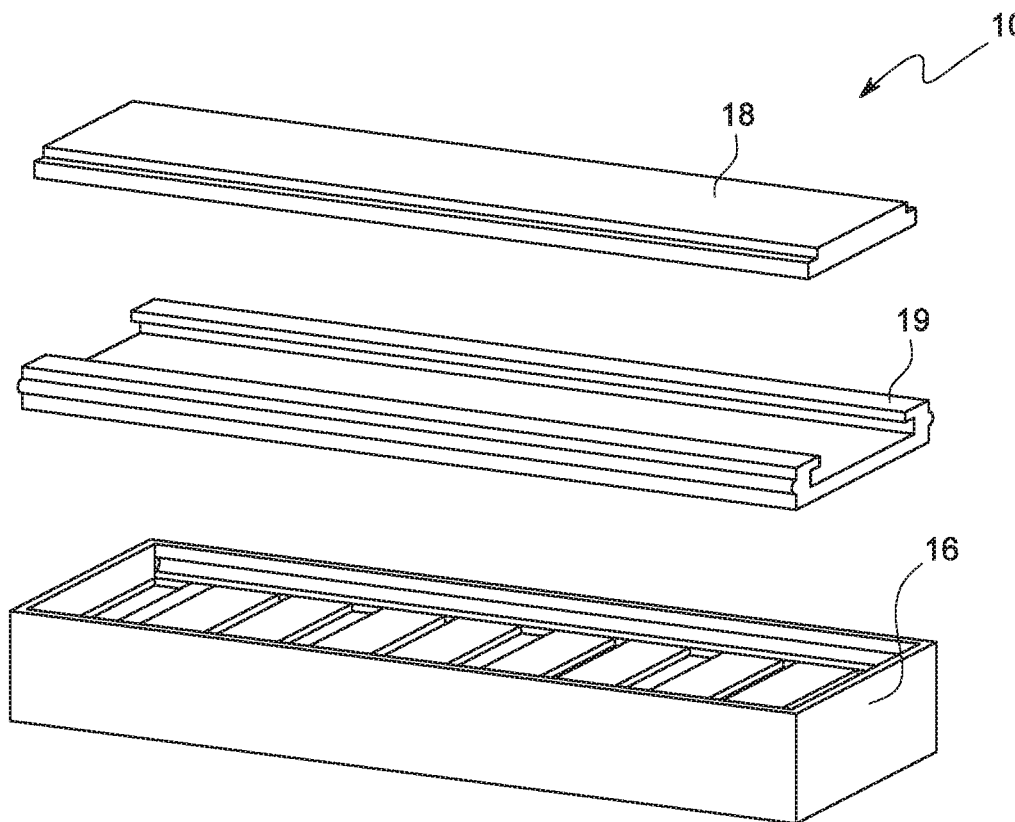
FIG. 6, according to an embodiment of the present invention, is an illustration of an exploded perspective view of the tool holder.

Referring to FIGS. 1 through 6, embodiments of the present invention are directed to a magnetic tool holder 10 for magnetically attaching magnetically-attractable tools 12 thereto. The tool holder 10 is adapted to be used in conjunction with a pegboard 14 whereby, in a way (as shown in FIG. 2), a tool 12 is attached to the pegboard 14 about the tool holder 10. In one embodiment of the present invention, the tool holder 10 comprises a tool holder base 16, a rectangular magnetic panel 18, and a magnet holder 19 for securing the magnetic panel 18 to the tool holder base 16.

Figure 7:
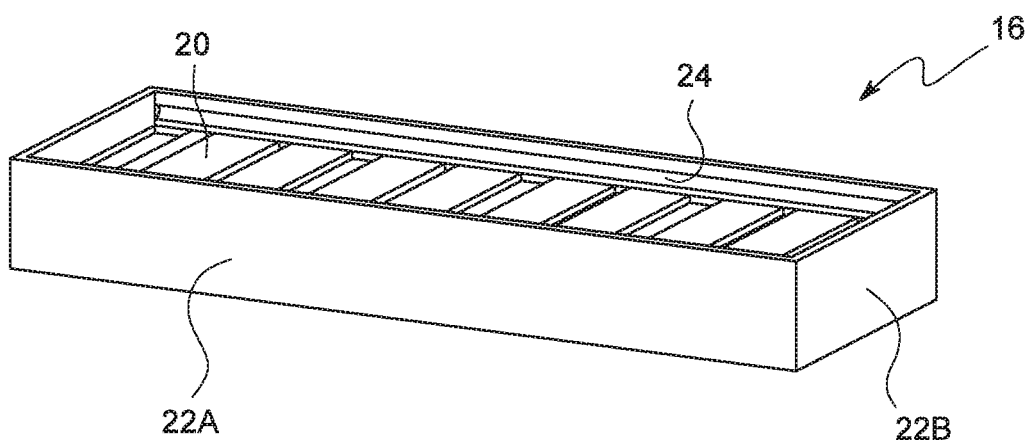
FIG. 7, according to an embodiment of the present invention, is an illustration of a perspective view of the tool holder base.
Figure 8:
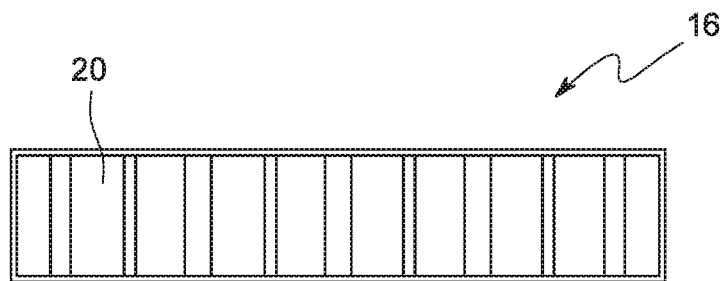
FIG. 8, according to an embodiment of the present invention, is an illustration of the top view of the tool holder base.
Figure 9:
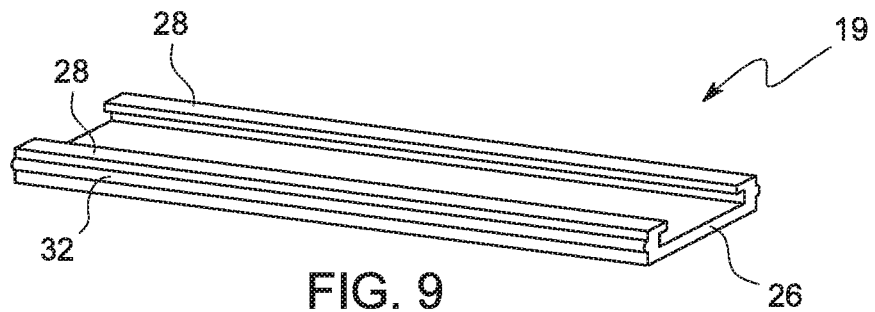
FIG. 9, according to an embodiment of the present invention, is an illustration of a perspective view of the magnet holder.
Figure 10:
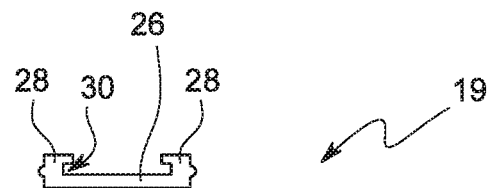
FIG. 10, according to an embodiment of the present invention, is an illustration of a side view of the magnet holder.
Figure 11:
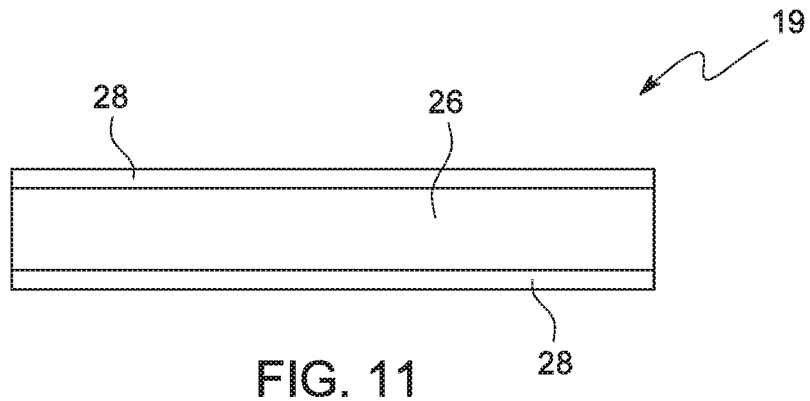
FIG. 11, according to an embodiment of the present invention, is an illustration of a top view of the magnet holder.

Referring to FIGS. 7 and 8, the tool holder base 16 comprises a rectangular structure defined by a planar bottom surface about which, the tool holder 10 is secured to the pegboard 14, a planar, ribbed top surface 20, and four base sidewalls 22 viz., two pairs of opposingly-disposed longitudinal and lateral sidewalls 22A and 22B, extending between the top 20 and bottom surfaces. Notably, the top edges of the base sidewalls 22 extend beyond the top surface 20 while the bottom edges of the base sidewalls 22 are flush with the bottom surface. In a way, an open receptacle is formed between the extended base sidewalls 22 and the top surface 20. The inner surface of each longitudinal base sidewall 22 is lined with an elongate base groove 24 extending along the length thereof wherein, the base groove 24 is of uniform cross-section.

Figure 12:
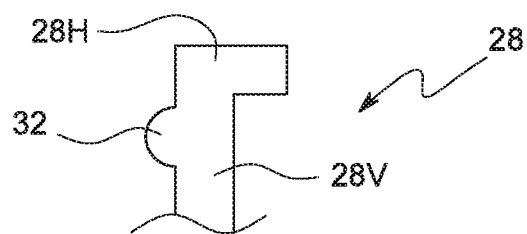
FIG. 12, according to an embodiment of the present invention, is an illustration of a side view of the L-shaped Member.

Referring to FIGS. 9 through 12, the magnet holder 19 comprises a magnet base 26 and a pair of opposingly-disposed elongate L-shaped members 28 extending from the magnet base 26. The magnet base 26 comprises a simple rectangular panel, the dimensions of which are more or less equivalent to that of the magnetic panel 18. Referring particularly to FIG. 12, each L-shaped member 28 comprises vertical and horizontal elongate members 28V and 28H wherein, the vertical member 28V, which is of uniform rectangular cross-section, integrally extends from a longitudinal edge of the magnet base 26, while the horizontal member 28H, which is also of uniform rectangular cross-section, integrally extends from the free edge of the vertical member 28V. Notably, an elongate magnet groove 30 of uniform cross-section is formed between the magnet base 26 and an L-shaped member 28 wherein, the utility of the magnet groove 30 will become apparent from the following body of text. Further, the magnet holder 20 comprises a pair of opposingly-disposed elongate ridges 32 disposed on the horizontal outer surfaces of the L-shaped member 28. Each ridge 32 is configured to correspond to the base groove 24 lined on the tool holder base 16.

Figure 13:
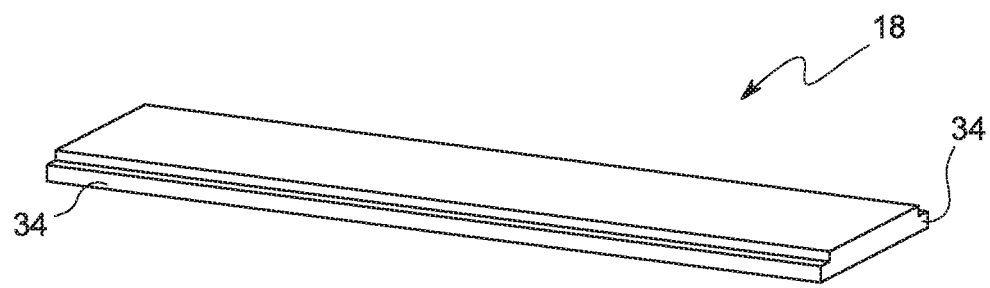
FIG. 13, according to an embodiment of the present invention, is an illustration of a perspective view of the magnetic panel.
Figure 14:
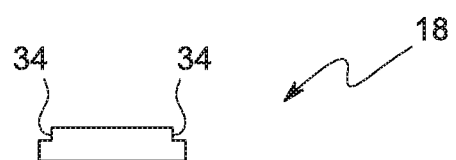
FIG. 14, according to an embodiment of the present invention, is an illustration of a side view of the magnetic panel.
Figure 15:
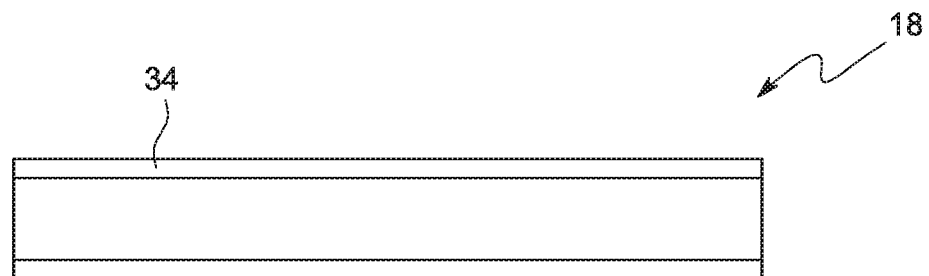
FIG. 15, according to an embodiment of the present invention, is an illustration of a top view of the magnetic panel.
Figure 16:
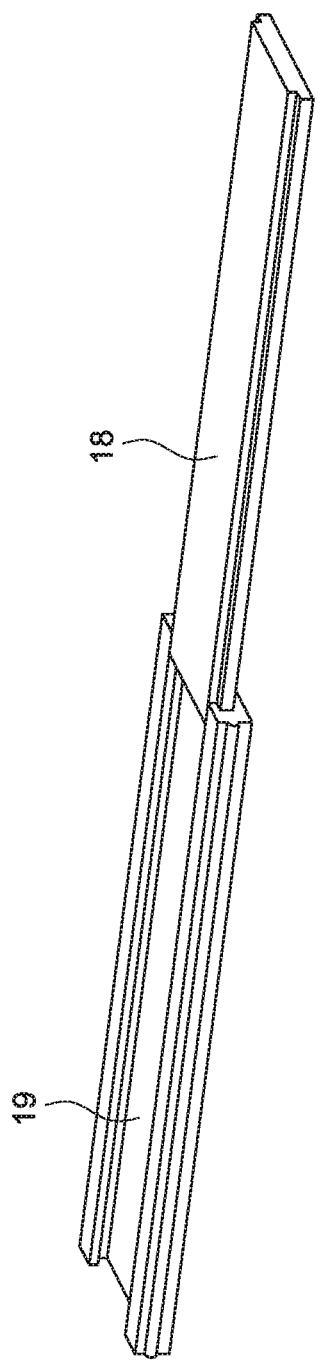
FIGS. 16 through 18, according to an embodiment of the present invention, are sequential illustration of the magnetic panel being received within the magnet holder.
Figure 17:
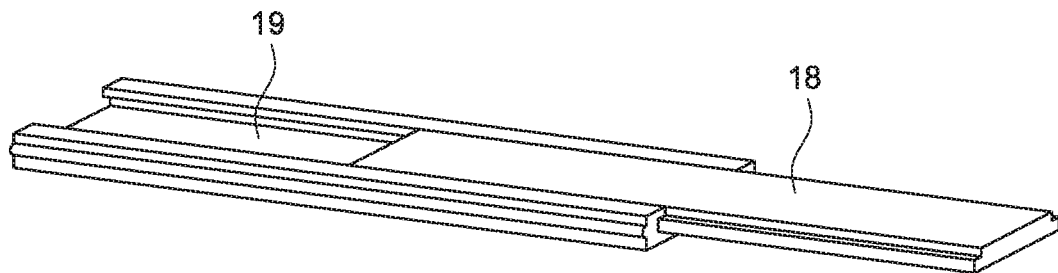
Figure 18:
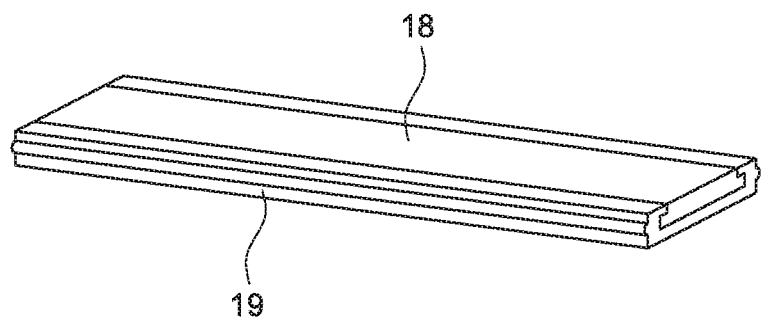
Figure 19:
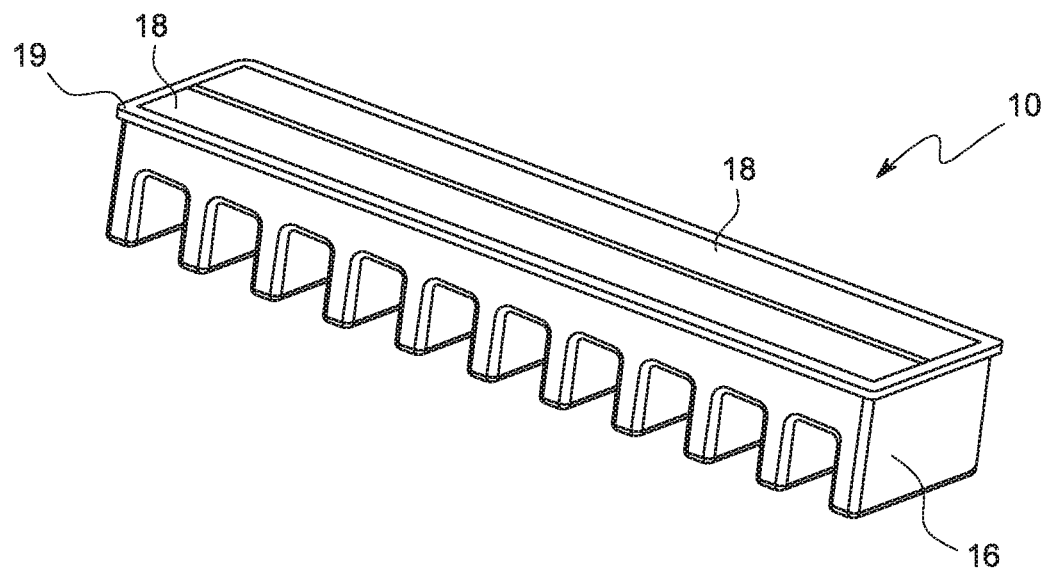
FIG. 19, according to another embodiment of the present invention, is an illustration of a perspective view of the tool holder.
Figure 20:
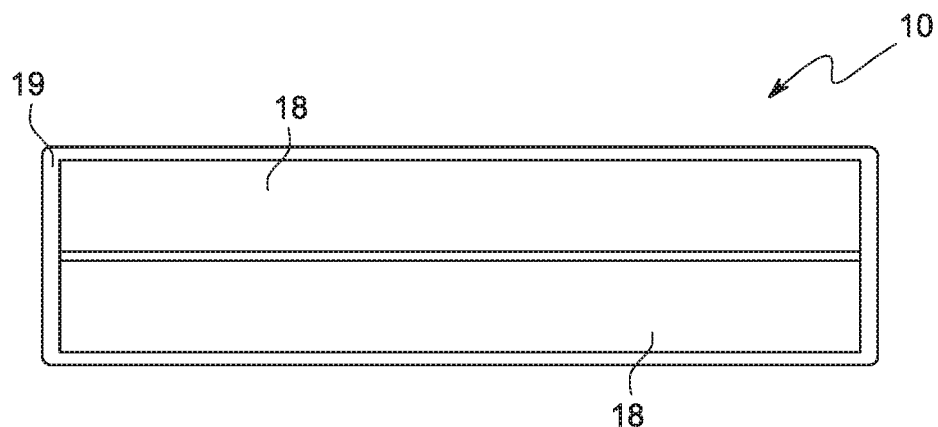
FIG. 20, according to another embodiment of the present invention, is an illustration of the top view of the tool holder.
Figure 21:
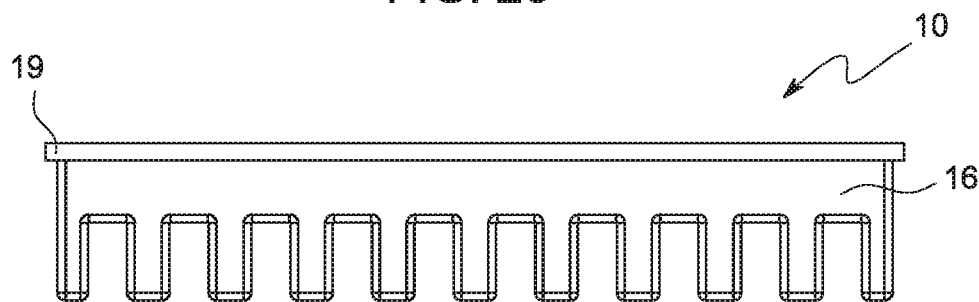
FIG. 21, according to another embodiment of the present invention, is an illustration of the front view of the tool holder.
Figure 22:
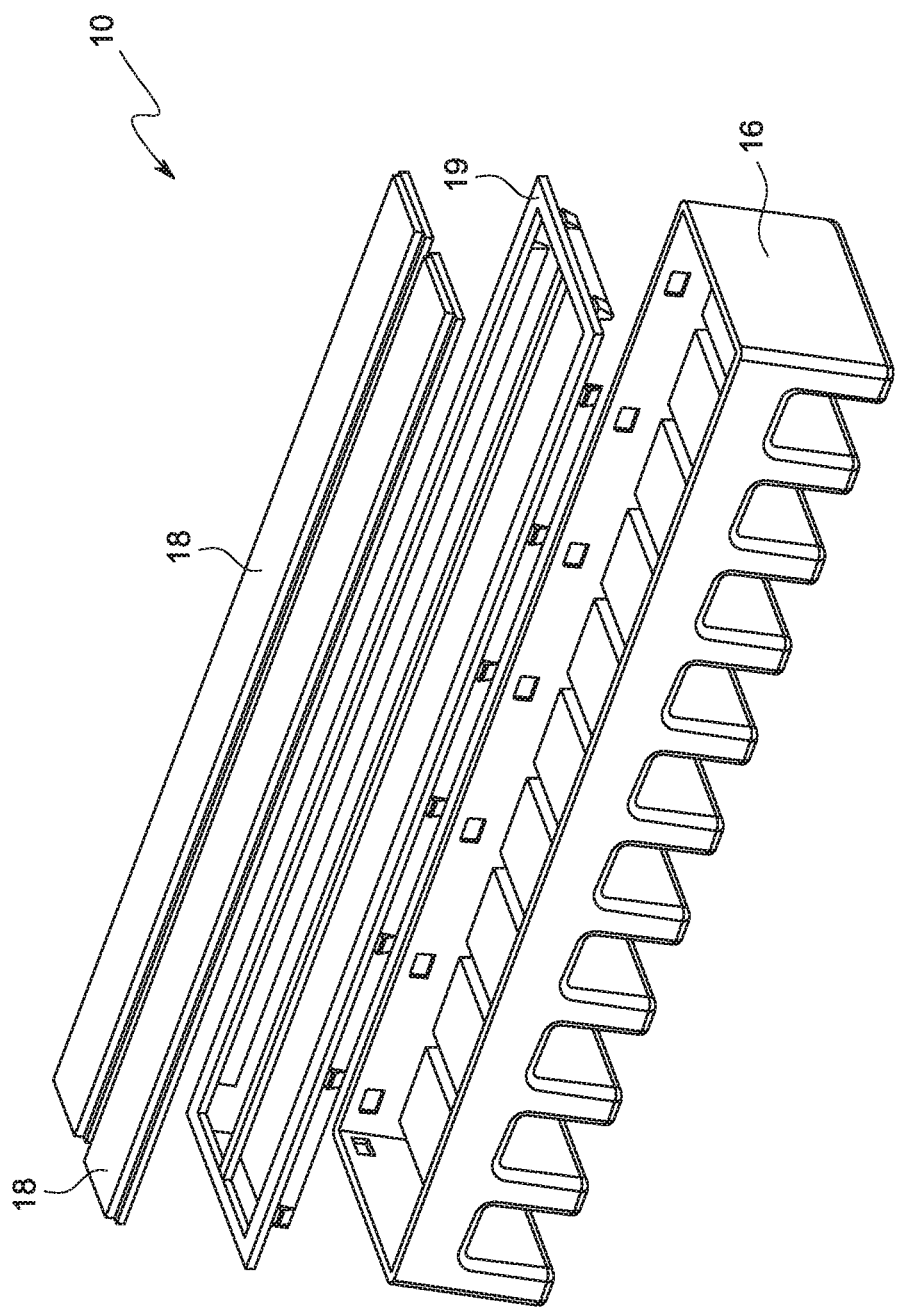
FIG. 22, according to another embodiment of the present invention, is an illustration of an exploded perspective view of the tool holder.

Referring to FIGS. 16 through 18, in order to assemble the magnet holder 19 and the magnetic panel 18, the magnetic panel 18 is simply slid into the magnet holder 19. The magnetic panel 18, as can be appreciated from FIGS. 13 through 15, comprises longitudinal stepped edges 34 whereby, the once the magnetic panel 18 is inserted into the magnet holder 19, the top surface of the magnetic panel 18 becomes flush with the top surfaces of the L-shaped member 28. Once the magnetic panel 18 and the magnet holder 19 are assembled, the magnet holder 19 is placed between the base sidewalls 22 and pushed downwards causing the ridge 32 to slide into the base groove 24 resulting in the magnet holder 19 being snap-fitted into the tool holder base 16.

Referring to FIGS. 19 through 22, in another embodiment, the magnetic tool holder 10 comprises a tool holder base 16, two rectangular magnetic panels 18, and a magnet holder 19 for securing the magnetic panels 18 to the tool holder base 16.

Figure 23:
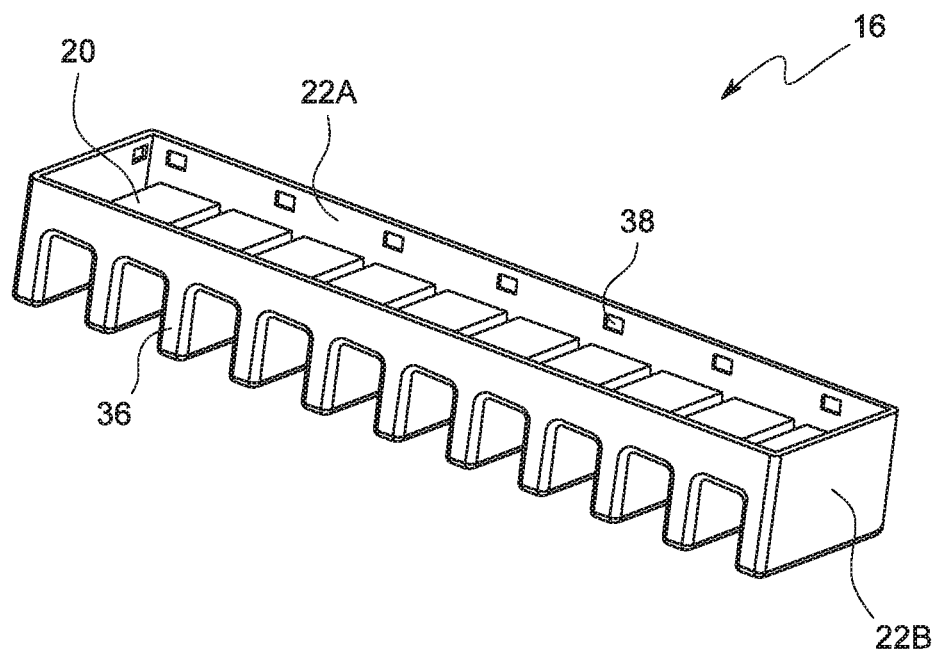
FIG. 23, according to another embodiment of the present invention, is an illustration of a perspective view of the tool holder base.
Figure 24:
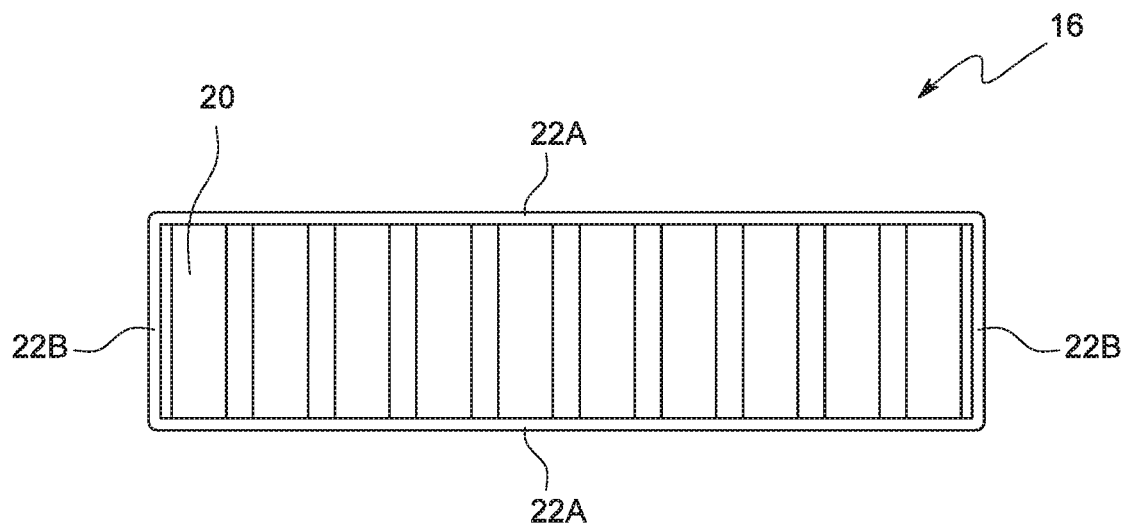
FIG. 24, according to an embodiment of the present invention, is an illustration of the top view of the tool holder base.
Figure 25:
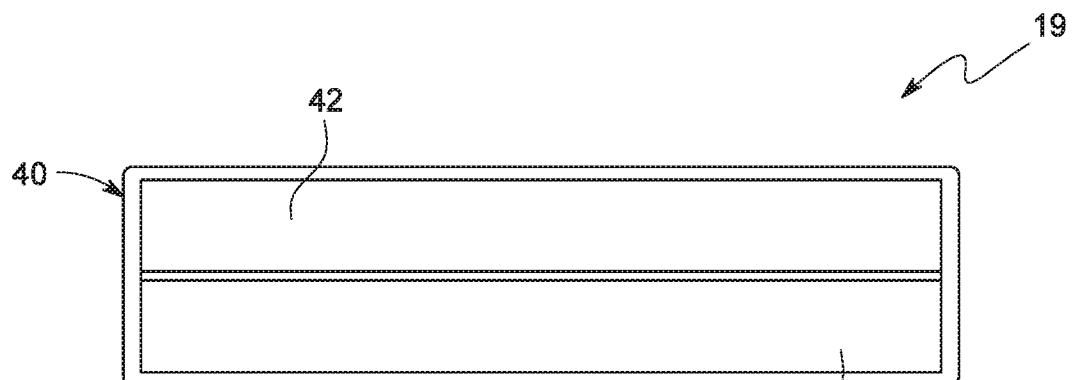
FIG. 25, according to another embodiment of the present invention, is an illustration of a top view of the magnet holder.
Figure 26:
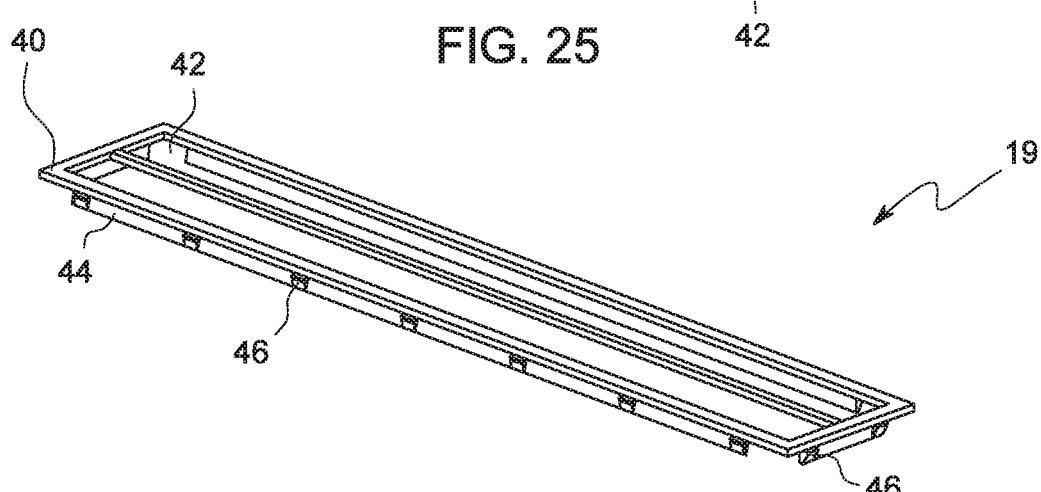
FIG. 26, according to another embodiment of the present invention, is an illustration of a perspective view of the magnet holder.
Figure 27:
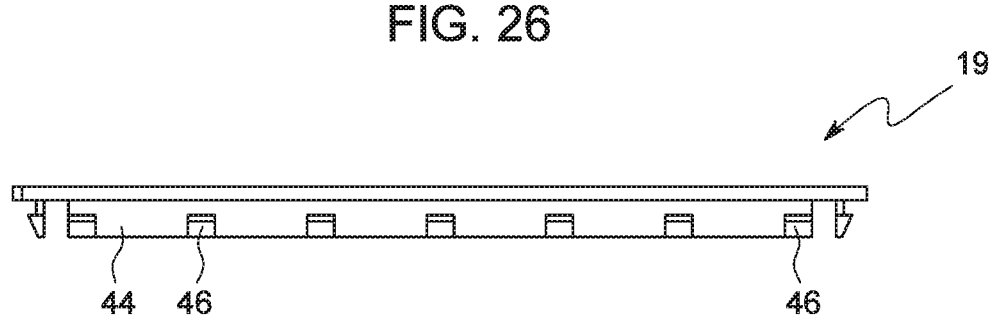
FIG. 27, according to another embodiment of the present invention, is an illustration of a front view of the magnet holder.
Figure 28:
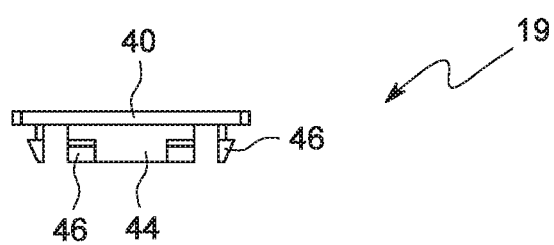
FIG. 28, according to another embodiment of the present invention, is an illustration of a side view of the magnet holder.

Referring to FIGS. 23 and 24, the tool holder base 16 comprises a rectangular structure defined by a ribbed bottom structure about which, the tool holder 10 is secured to the pegboard 14, a planar, ribbed top surface 20, and four base sidewalls 22 viz., two pairs of opposingly-disposed longitudinal and lateral sidewalls 22A and 22B, extending between the top surface 20 and bottom ribbed structure. More particularly, the bottom ribbed structure comprises a plurality of aligned ribbed legs 36 extending along the length of the tool holder base 16. Notably, the top edges of the base sidewalls 22 extend beyond the top surface 20. In a way, an open receptacle is formed between the extended base sidewalls 22 and the top surface 20. The inner surface of each longitudinal base sidewall 22 is lined with a plurality of aligned oblique notches 38 extending along the length thereof wherein, the utility of the notches 38 will become apparent from the following body of text.

Referring to FIGS. 25 through 28, the magnet holder 19 comprises a rectangular top panel 40 comprising two rectangular openings 42 that are disposed side-by-side such that, the longitudinal edges of the rectangular openings 42 face one another. Each rectangular opening 42 is adapted to receive a magnetic panel 18 therewithin whereby, the top surface of the magnetic panel 18 is exposed for enabling a tool to be attached thereto. Four magnetic holder sidewalls 44 integrally extend from the top panel 40 wherein, the four magnetic holder sidewalls 44 are adapted to be slidably received and eventually snap-fitted between the four base sidewalls 22. More particularly, of the four magnet holder sidewalls 44, two of them extend from the longitudinal edges of the two rectangular openings 42 that are disposed farthest from one another. Of the remaining two magnet holder sidewalls 44, each magnet holder sidewall 44 extends the aligned lateral edges of two rectangular openings 42. Each magnet holder sidewall 44 is attached with a plurality of oblique projections 46 that are configured to correspond to the aforementioned oblique notches 38. Notably, as can be appreciated from the drawings, the edges of the top panel 40 extend beyond the base sidewalls 22.

Figure 29:
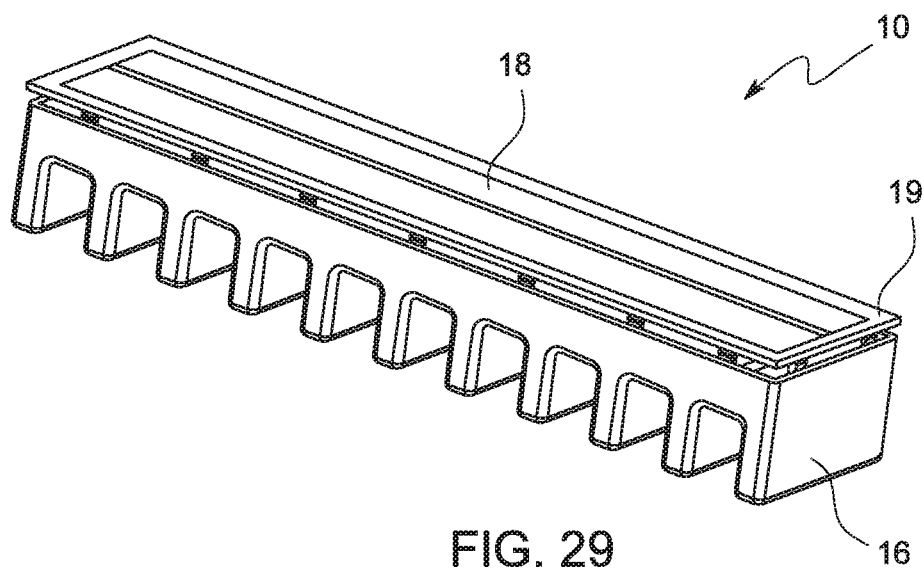
FIGS. 29 and 30, according to another embodiment of the present invention, are sequential illustrations of the magnet holder being engaged to the tool holder base.
Figure 30:
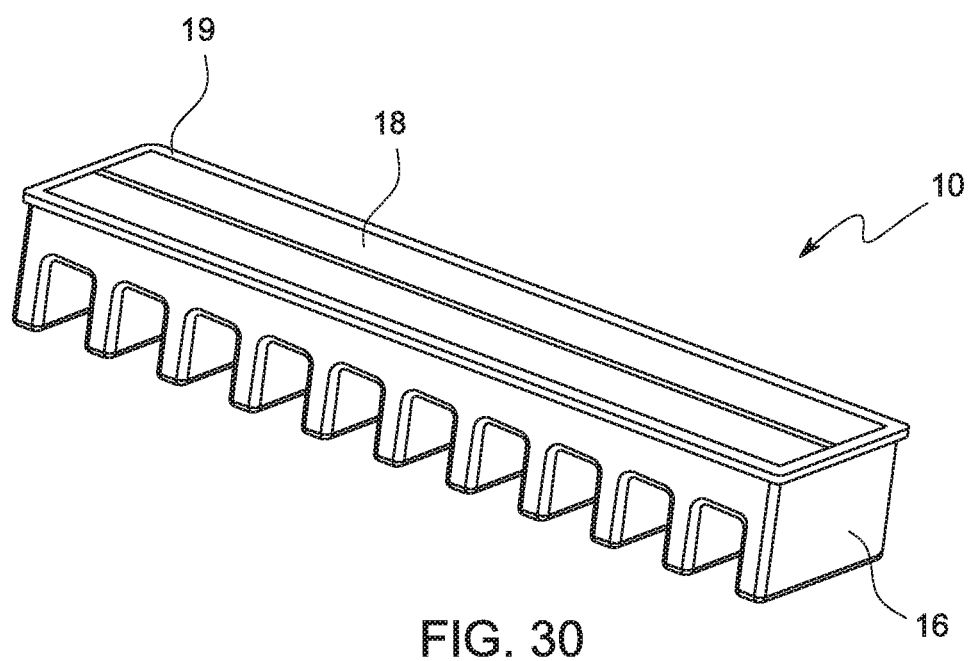

Referring to FIGS. 29 and 30, in order to assemble the magnetic tool holder 10, initially, the magnet holder 19 assembled with the two magnetic panels 18 within the designated rectangular openings 42. Thereafter, the magnet holder sidewalls 44 are appropriately placed between the four base sidewalls 22. At this point, the magnet holder 19 is simply pressed downwards causing the projections 46 to slide into the notches 38 resulting in a snap-fit between the magnet holder 19 and the tool holder base 16, ultimately resulting in the assemblage of the magnetic tool holder 10.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. For example, the protective case assembly can be adapted to accommodate a tablet PC by simply altering the dimensions thereof. However, all such modifications are deemed to be within the scope of the claims.

The invention claimed is:

1. A magnetic tool holder comprising:
   a plurality of magnetic panels;
   a frame for maintaining the plurality of magnetic panels in position;
   each of the magnetic panels having an upper surface for magnetic attachment, opposed longitudinal sides and opposed lateral ends, each of the longitudinal sides defining a longitudinal stepped edge, and a bottom surface;
   the frame having longitudinal members connected to lateral members, each of the longitudinal members of the frame defining a longitudinal lip, each longitudinal lip cooperating with a corresponding longitudinal stepped edge of one of the magnetic panels;
   a base member attached to the frame, the base member having a top surface contacting the bottom surface of the magnetic panels and supporting the magnetic panels, the base member and frame cooperating to maintain the top surface of the magnetic panel exposed for magnetic attachment.

2. The magnetic tool holder of claim 1, the frame further defining an upper surface, and wherein the upper surface of the frame is flush with the upper surface of the magnetic panel.

3. The magnetic panel holder of claim 1, wherein the base member and frame are attached by cooperating locking mechanisms.

4. The magnetic panel holder of claim 3, wherein the cooperating locking mechanisms comprise a snap-fit mechanism or a tongue-and-groove assembly.

5. The magnetic panel holder of claim 3, wherein the cooperating locking mechanisms are a cooperating projections and notches.

6. The magnetic panel holder of claim 1, wherein the lateral members of the frame cooperate with the opposed lateral ends of the magnetic panels to maintain the magnetic panels in position by preventing longitudinal movement of the magnetic panels.

7. The magnetic panel holder of claim 1, wherein the opposed lateral ends of the magnetic panels each define a stepped edge, and wherein each of the lateral members of the frame defines a lip cooperating with a respective one of the stepped edges of a corresponding lateral end of the magnetic panel.

8. The magnetic panel holder of claim 1, wherein the base member defines opposing side walls and end walls.

9. The magnetic panel holder of claim 8, wherein the base member defines a bottom wall extending between the opposing side and end walls of the base member.

10. The magnetic panel holder of claim 1, the base member having a plurality of ribs defining generally U-shaped cavities between the ribs.

11. The magnetic panel holder of claim 1, wherein the frame fits around a perimeter defined by the base member.

12. The magnetic panel holder of claim 1, the magnetic panels for securing ferrous tools thereto.

13. The magnetic panel holder of claim 1, wherein the base member is adapted to be attached to a peg board.

* * * * *